United States Patent
Moreno et al.

(10) Patent No.: US 10,207,347 B2
(45) Date of Patent: Feb. 19, 2019

(54) RECIPROCATING TOOL WITH INVERSE BUSHING

(71) Applicants: Robert Bosch Tool Corporation, Chicago, IL (US); Robert Bosch GmbH, Stuttgart (DE)

(72) Inventors: Jaime Moreno, Arlington Heights, IL (US); Brad Holmes, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 964 days.

(21) Appl. No.: 14/109,153

(22) Filed: Dec. 17, 2013

(65) Prior Publication Data

US 2014/0182428 A1    Jul. 3, 2014

Related U.S. Application Data

(60) Provisional application No. 61/746,252, filed on Dec. 27, 2012.

(51) Int. Cl.
| | |
|---|---|
| *B23D 49/16* | (2006.01) |
| *B25F 5/00* | (2006.01) |
| *B23D 51/02* | (2006.01) |

(52) U.S. Cl.
CPC .......... *B23D 49/162* (2013.01); *B23D 51/02* (2013.01); *Y10T 74/18208* (2015.01); *Y10T 74/18256* (2015.01); *Y10T 83/04* (2015.04); *Y10T 83/9481* (2015.04)

(58) Field of Classification Search
CPC .... B23D 51/16; B23D 49/167; B23D 49/162; B23D 49/165; Y10T 74/18256; Y10T 74/18208; Y10T 83/9481; B25D 11/062; B25D 2211/068

USPC .......... 30/392–394; 74/44, 50, 25; 173/109, 173/114, 122, 201; 384/26, 32, 38, 42; 92/178

See application file for complete search history.

(56) References Cited

U.S. PATENT DOCUMENTS

| | | | | |
|---|---|---|---|---|
| 1,342,131 A | * | 6/1920 | Mycock | F26B 13/14 |
| | | | | 277/399 |
| 2,547,922 A | * | 4/1951 | Bechtold | B23D 49/167 |
| | | | | 30/376 |
| 3,130,759 A | * | 4/1964 | Mohr | B23D 49/162 |
| | | | | 144/35.1 |

(Continued)

FOREIGN PATENT DOCUMENTS

| | | |
|---|---|---|
| CN | 102744715 A | 10/2012 |
| EP | 0 949 033 A2 | 10/1999 |

(Continued)

OTHER PUBLICATIONS www.dictionary.combrowse/receptacle.*

(Continued)

*Primary Examiner* — Laura M Lee
(74) *Attorney, Agent, or Firm* — Maginot, Moore & Beck LLP

(57) ABSTRACT

In one embodiment, a reciprocating tool includes a reciprocating plunger, the plunger including an inner wall defining a chamber portion within the plunger, a motor operably connected to the plunger, and a bushing located at least partially within the chamber and contacting the inner wall.

14 Claims, 6 Drawing Sheets

(56) References Cited

U.S. PATENT DOCUMENTS

| | | | | |
|---|---|---|---|---|
| 3,365,963 | A * | 1/1968 | Happe | B26B 15/00 30/180 |
| 4,436,163 | A * | 3/1984 | Simpson | A01G 3/053 173/109 |
| 5,079,844 | A * | 1/1992 | Palm | B23D 49/162 30/392 |
| 5,083,376 | A | 1/1992 | Lentino | |
| 5,099,705 | A * | 3/1992 | Dravnieks | B23D 51/02 30/392 |
| 5,450,925 | A * | 9/1995 | Smith | B23D 49/165 184/5 |
| 5,689,891 | A * | 11/1997 | Bednar | B23D 49/162 30/392 |
| 5,993,304 | A * | 11/1999 | Eriksson | B23Q 5/027 451/356 |
| 6,249,979 | B1 * | 6/2001 | Bednar | B23D 49/165 30/182 |
| 6,286,217 | B1 * | 9/2001 | Dassoulas | B23D 51/16 30/220 |
| 6,523,267 | B1 | 2/2003 | Osada et al. | |
| 6,634,107 | B2 * | 10/2003 | Osada | B23D 49/165 30/392 |
| 6,670,869 | B2 * | 12/2003 | Henningsson | F16C 29/002 333/219.1 |
| 6,758,119 | B1 * | 7/2004 | Neitzell | B23D 51/16 30/393 |
| 6,772,662 | B2 * | 8/2004 | Marinkovich | B23D 51/16 30/394 |
| 7,096,589 | B2 * | 8/2006 | Phillips | B23D 49/11 30/392 |
| 7,127,973 | B2 * | 10/2006 | Neitzell | B23D 49/165 30/393 |
| 9,314,912 | B2 * | 4/2016 | Binder | B25D 11/06 |
| 2004/0049928 | A1 | 3/2004 | Phillips et al. | |
| 2011/0247847 | A1 * | 10/2011 | Holmes | B23D 49/165 173/19 |
| 2012/0073849 | A1 * | 3/2012 | Ivarsson | A61C 17/40 173/217 |
| 2012/0267136 | A1 * | 10/2012 | Mossnang | B25D 17/24 173/162.2 |

FOREIGN PATENT DOCUMENTS

| | | |
|---|---|---|
| EP | 2374565 A2 | 10/2011 |
| GB | 2446253 A | 8/2008 |

OTHER PUBLICATIONS

International Search Report and Written Opinion corresponding to PCT Application No. PCT/US2013/077662, dated Apr. 2, 2014 (9 pages)

\* cited by examiner

RECIPROCATING TOOL WITH INVERSE BUSHING

This application claims the benefit of U.S. Provisional Application No. 61/746,252 filed Dec. 27, 2012, the entirety of which is incorporated herein by reference.

FIELD

This disclosure relates to power hand tools and more specifically to reciprocating power hand tools.

BACKGROUND

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner. Various approaches have been developed which translate the rotational motion into reciprocating motion. A common approach is the incorporation of a wobble plate drive.

A "wobble plate" assembly is a configuration wherein a shaft has an angled portion on which an arm is mounted through a ball bearing assembly. The arm is slidingly positioned within a portion of a plunger assembly. As the angled portion of the shaft rotates, the arm translates the rotation of the shaft into a reciprocating movement of the plunger assembly. One example of a reciprocating tool which incorporates a wobble plate drive is U.S. Patent Publication No. 2011/0247847, which was published on Oct. 13, 2011, the entire contents of which are herein incorporated by reference.

As the plunger assembly moves along an axis, a significant amount of momentum is created. All of this momentum is absorbed by the tool as the plunger assembly reverses direction. Thus, a user of a reciprocating tool incorporating a wobble plate drive must contend with a powerfully vibrating device. In order to make such reciprocating tools more controllable, reciprocating tools such as the device in the '847 patent publication incorporate a counterweight which is driven by a secondary wobble plate in a direction opposite to the direction of the plunger assembly. In order to function properly, the housing enclosing the counterweight must be large enough to allow for travel of the counterweight without touching other components. Thus, while the incorporation of a secondary wobble plate and counterweight is effective, such systems can be bulky and expensive.

A need exists for a reciprocating tool which reduces vibration of a wobble plate drive. A further need exists for a reciprocating tool which reduces vibration of a wobble plate drive which does not rely upon bulky assemblies. A system which reduces vibrations in a reciprocating tool while reducing costs associated with vibration reduction would be further beneficial. A system which reduces the overall size of a reciprocating tool so that it is portable and convenient to use without sacrificing the performance.

SUMMARY

In one embodiment, a reciprocating tool includes a reciprocating plunger, the plunger including an inner wall defining a chamber portion within the plunger, a motor operably connected to the plunger, and a bushing located at least partially within the chamber and contacting the inner wall.

In another embodiment, a method of operating a reciprocating tool includes rotating a shaft with a motor, translating the rotation of the shaft into a reciprocating motion of a plunger, and supporting the reciprocating plunger with a bushing located at least partially within a chamber defined by the plunger.

DESCRIPTION

Figure 1:
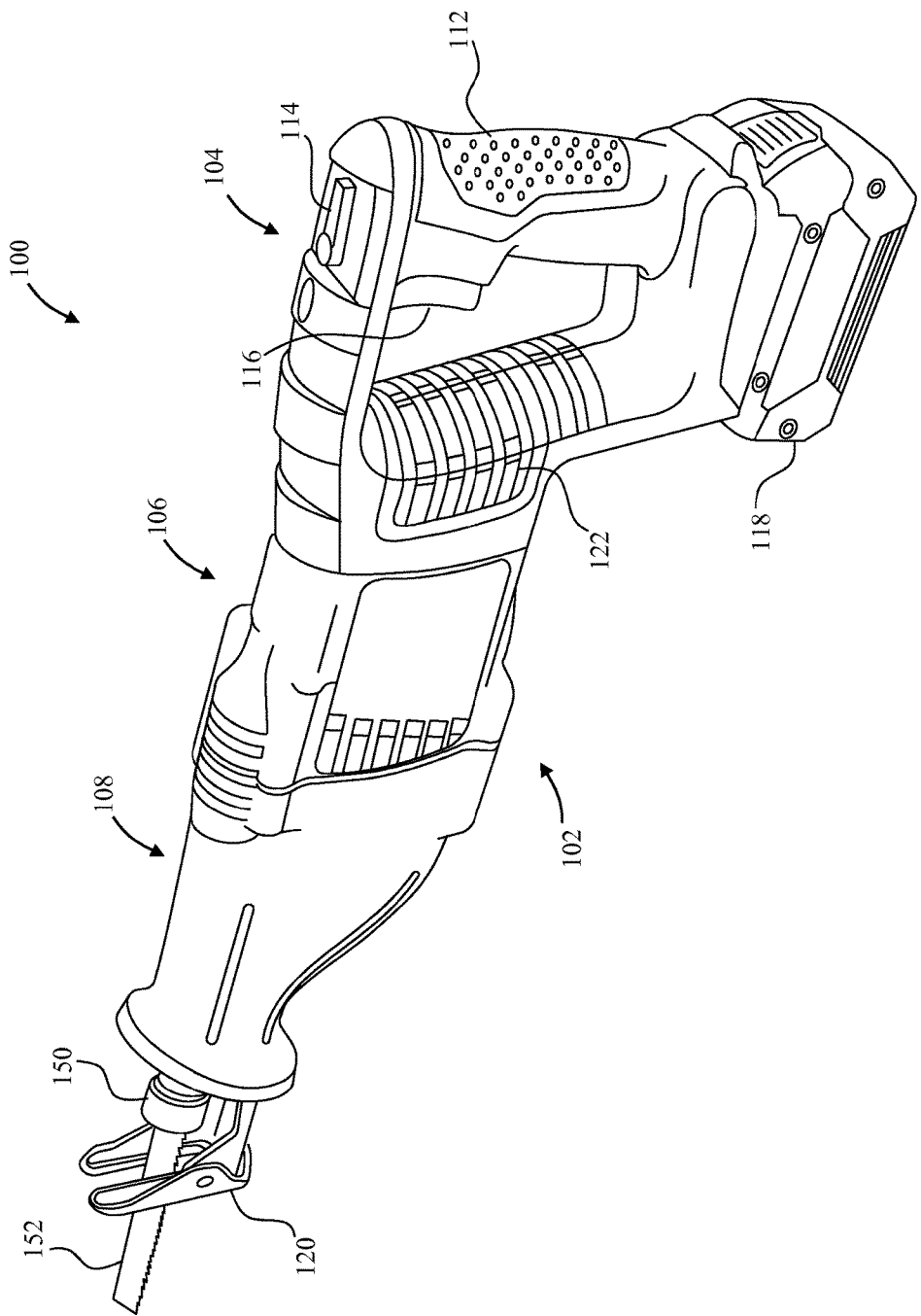
FIG. 1 depicts a side perspective view of a reciprocating tool incorporating an inverse bushing in accordance with principles of the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

FIG. 1 depicts a reciprocating saw 100 including an outer housing 102 which includes a handle portion 104, a motor portion 106, and a nose portion 108. The handle portion 104 includes a grip 112. A dual-speed switch 114 and a variable speed trigger 116 extend from the handle portion housing 104. The handle portion 104 is configured to removably receive a battery pack 118 which in some embodiments is replaced by a corded power supply.

The nose portion 108 is shaped to allow a user to grip the tool 100 while the tool 100 is in use and in some embodiments is made from a rubber material. A foot plate assembly 120 is located forwardly of the nose portion 108.

Figure 2:
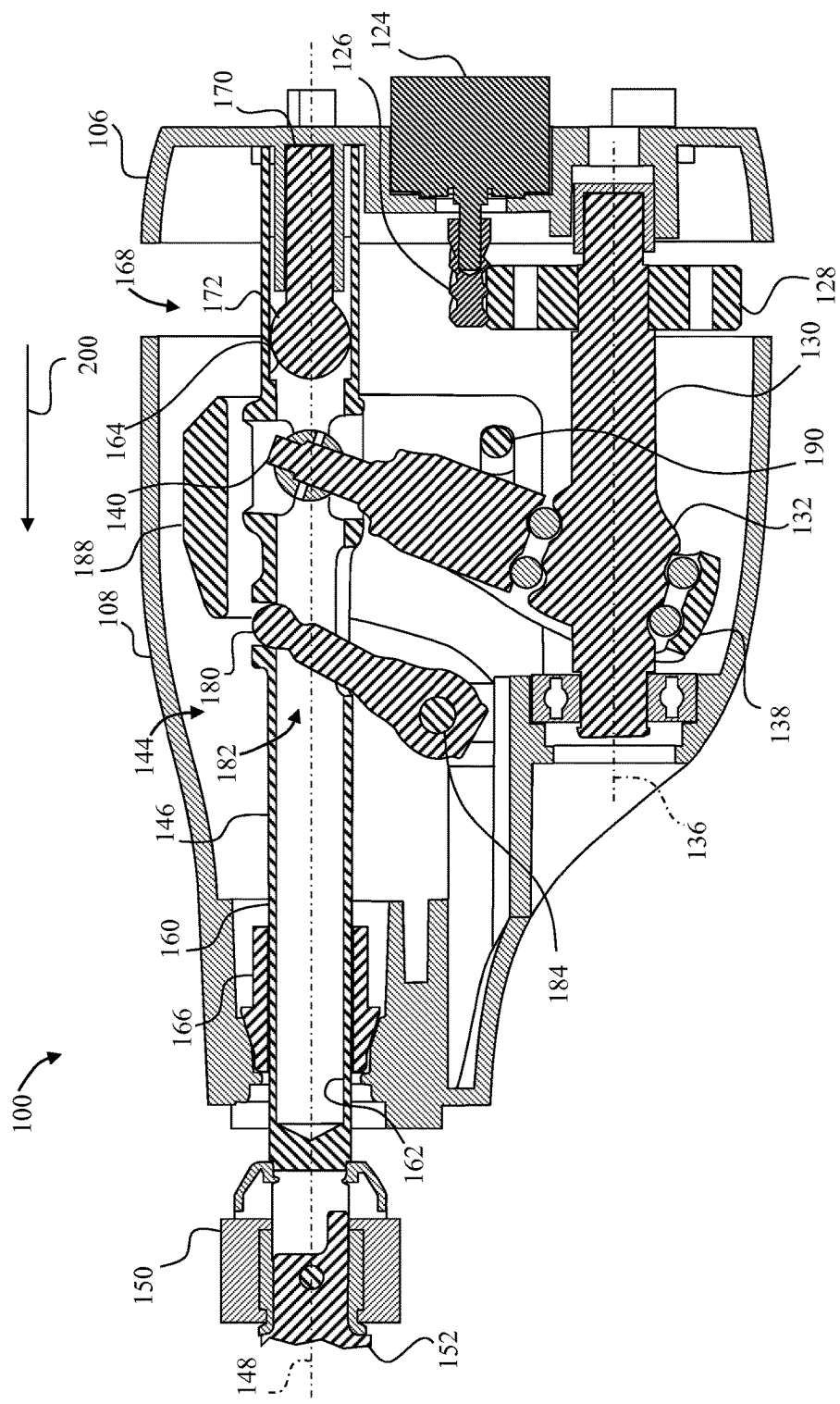
FIG. 2 depicts a side cross-sectional view of the tool of FIG. 1 with the housing removed and the counterweight positioned about the plunger.

The motor portion 106 includes a number of ventilation ports 122 which are used to provide cooling air to a motor 124 shown in FIG. 2. An optional noise reduction system (not shown) for reducing noise generated by the motor is positioned within the motor portion 106 to discharge unwanted noise. The motor 124 rotatably drives an output shaft 126 which is engaged with a gear 128. The gear 128 is fixedly connected to a drive shaft 130 with an offset portion 132. The drive shaft 130 rotates about an axis of rotation 136.

A wobble plate assembly 138 is rotatably positioned on the offset portion 132. The wobble plate assembly 138 includes an adaptor arm 140 which drives a plunger assembly 144 in a reciprocating motion. A plunger 146 of the plunger assembly 144 is configured to reciprocate along a plunger axis 148. A chuck assembly 150 is located at a forward portion of the plunger 146. The chuck assembly 150 releasably holds a saw blade 152.

The plunger 146 includes an outer wall 160 and an inner wall 162 which defines a chamber 164 at a rearward location of the plunger 146. The plunger 146 is supported at a forward location by a front bushing 166 which extends about the outer wall 160. At a rearward location, the plunger 144 is supported by a rear bushing 168 which is located partially within the chamber 164.

The rear bushing 168 includes a stem portion 170 and a head portion 172. The stem portion is 170 is supported by at least a portion of the housing 102 and extends into the chamber 164. In other embodiments, an optional housing for accommodating the motor portion 106 may be provided and disposed within the outer housing 102. In such embodiments, the stem portion is 170 is supported by the motor housing and extends into the chamber 164. The head portion 172 has a radius that is slightly smaller than the radius of the rearward portion of the chamber 164. In the embodiment of FIG. 2, the head portion 172 is spherical. In other embodiments, the head portion is another curved shape, such as a cylinder. Accordingly, the head portion 172 contacts the inner wall 162 at only a single point of contact whereas in an embodiment with a cylindrical head portion, a line of contact is established.

Figure 3:
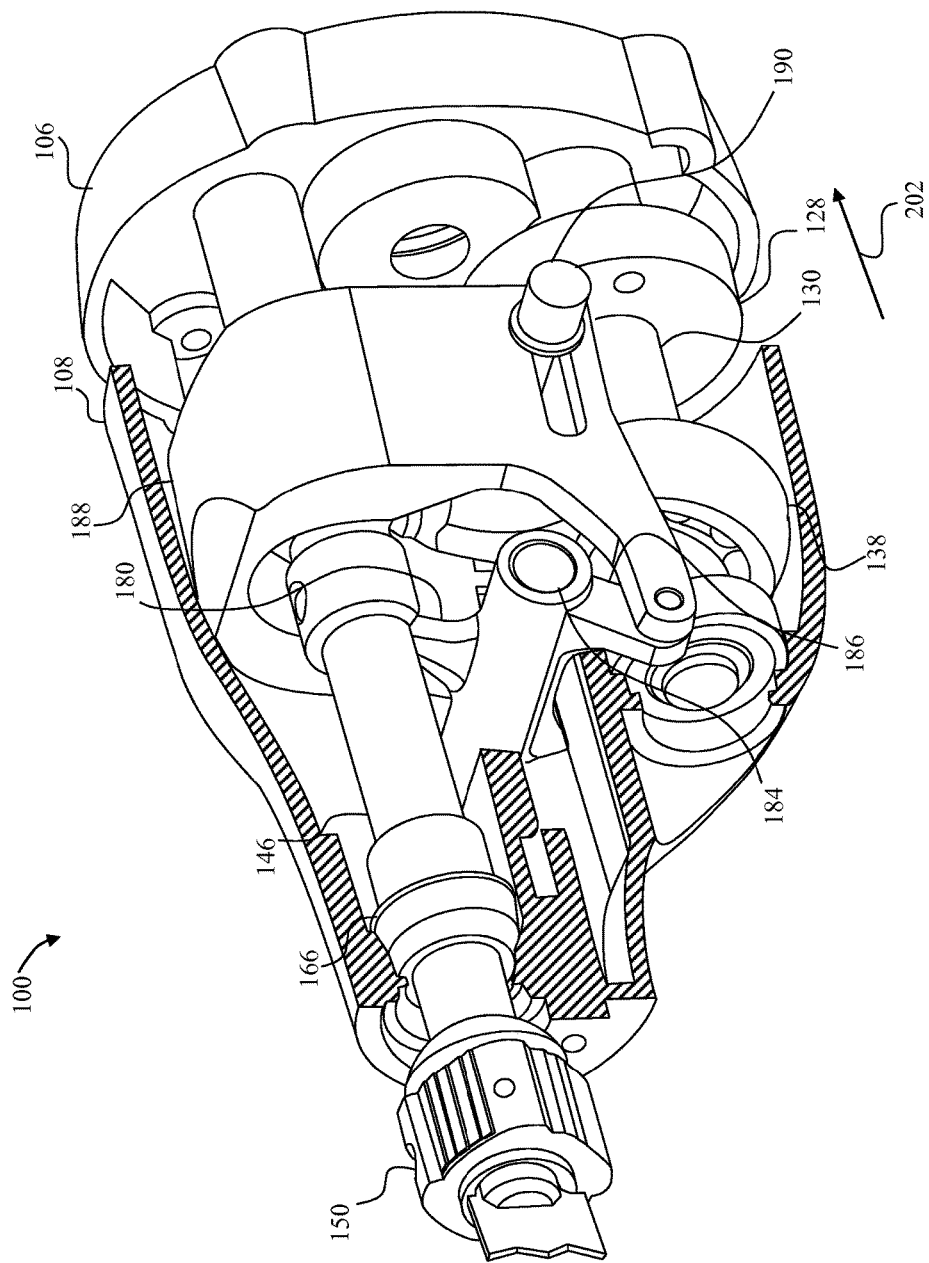
FIG. 3 depicts a side perspective view of the tool of FIG. 1 with a portion of the housing removed and the counterweight positioned about the plunger.

The plunger 146 is operably engaged with an upper arm 180 of a pivot arm assembly 182. The pivot arm assembly 182 pivots about a pivot 184. A pair of lower arms 186 (shown partially in FIG. 3) is located generally below the pivot 184. The lower arms 186 are pivotably connected to a counterweight 188. The counterweight is slidingly supported by a support bar 190. The counterweight 188 wraps around the outer wall 160 of the plunger 146 without contacting the plunger 146.

In operation, a user applies power to the motor 124 from the battery pack 118 by selecting a speed range with the dual-speed switch 114 and depressing the variable speed trigger 116. As power is applied to the motor 124, the output shaft 126 rotates.

Rotation of the shaft 126 forces the gear 128 to rotate and, since the gear 128 is fixedly connected to the drive shaft 130, the drive shaft 130 rotates as well. The wobble plate assembly 138 is constrained against movement orthogonal to the plunger axis 148 by the plunger 146. Accordingly, as the drive shaft 130 rotates the top of the wobble plate assembly 138 pivots forwardly, in the direction of the arrow 200 of FIG. 2. Movement of the top of the wobble plate assembly 138 in the direction of the arrow 200 forces the plunger 146 to move in the direction of the arrow 200.

As the plunger 146 moves forwardly, the rear bushing 168 and the front bushing 166 maintain the plunger 146 aligned with the plunger axis 148. The front bushing 166 encircles the outer wall 160 thereby constraining the plunger 146 from misalignment with the plunger axis 148. The rear bushing 168 is an inverse bushing. Thus, the rear bushing 168 contacts the inner wall 162 to constrain the plunger 146 from misalignment with the plunger axis 148.

As the plunger 146 moves forwardly in the direction of the arrow 200, the plunger 146 pushes against the upper arm 180 of the pivot arm assembly 182. This forces the pivot arm assembly 182 to pivot about the pivot 184. As the pivot arm assembly 182 picots, the lower arms 186 are forced rearwardly, in the direction of the arrow 202 of FIG. 3. The rearward movement of the lower arms 186 force the counterweight 188 to slide rearwardly along the support bar 190.

Figure 4:
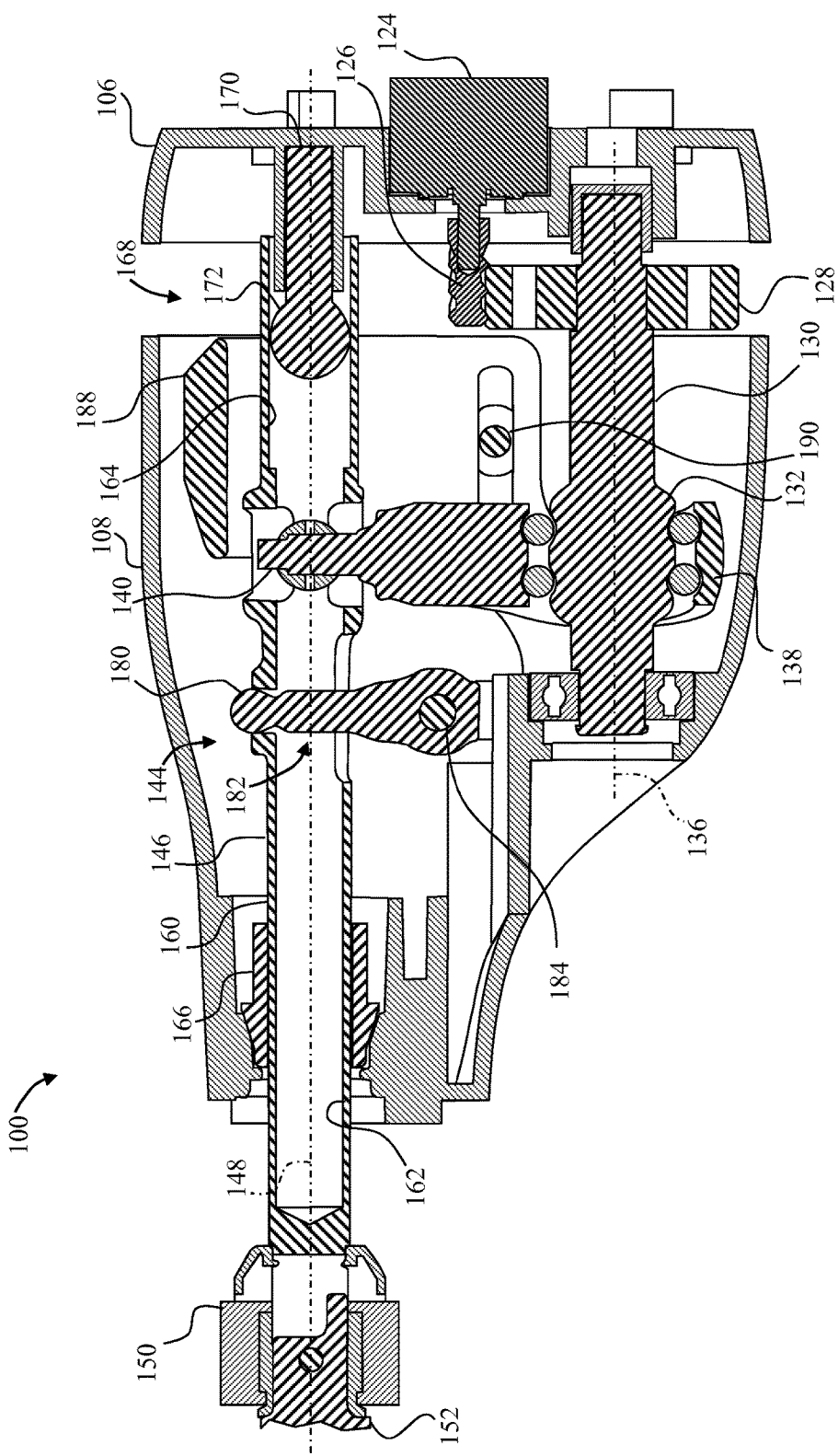
FIG. 4 depicts a side cross-sectional view of the tool of FIG. 1 with the counterweight at a mid-stroke location.
Figure 5:
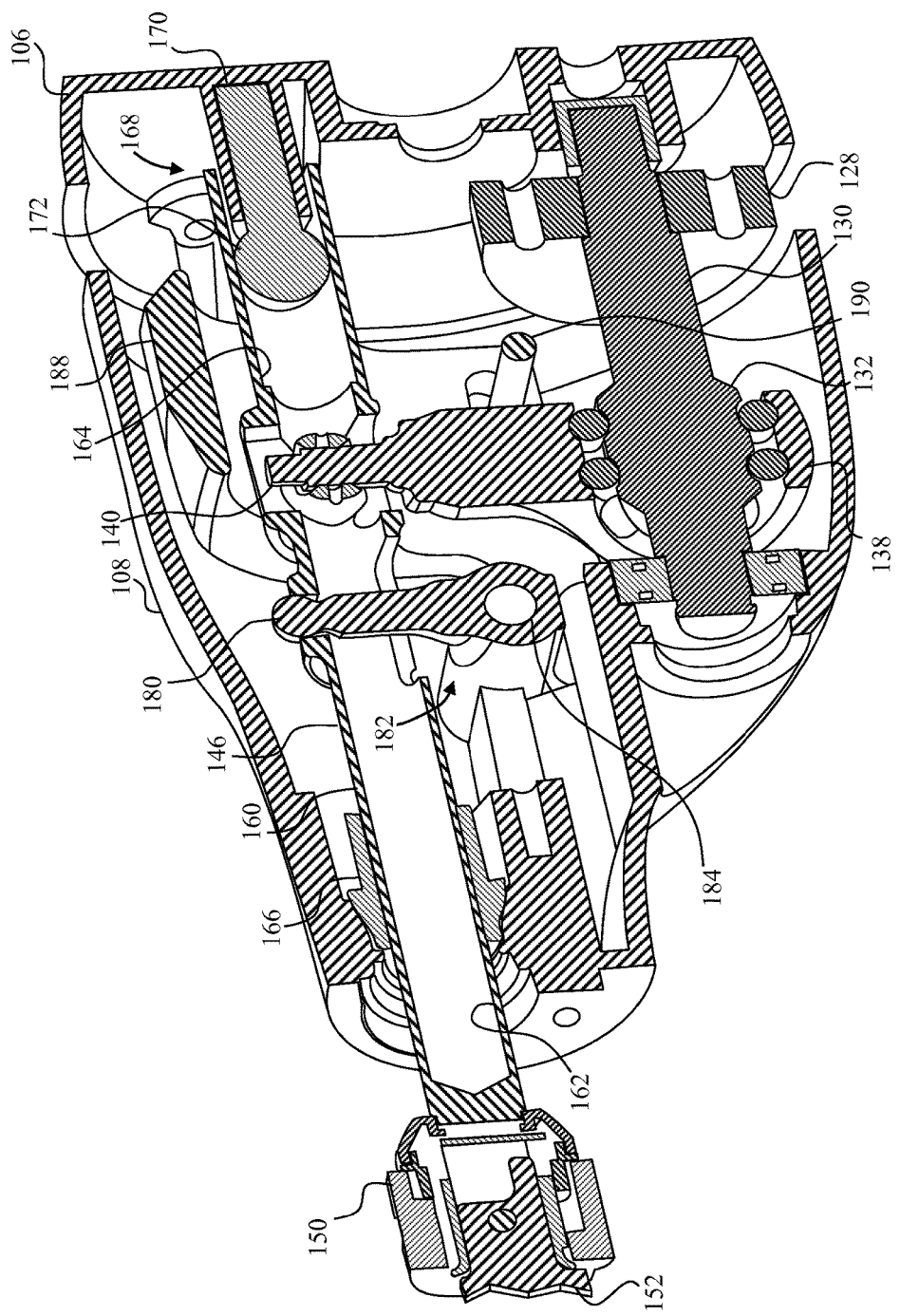
FIG. 5 depicts a side perspective view of the tool of FIG. 1 with the counterweight at a mid-stroke location.

As the counterweight 188 moves rearwardly in opposition to the forwardly motion of the plunger 146 to a mid-stroke location as depicted in FIGS. 4 and 5, the counterweight 188 moves directly over the head portion 172 of the rear bushing 168. Because the rear bushing 168 is located within the chamber 164, however, the rear bushing 168 does not interfere with movement of the counterweight 188. Thus, the counterweight 188 need only be spaced apart from the plunger 146 by a distance necessary to clear features of the plunger 146. This allows for a more compact arrangement of components within the nose portion housing 108.

Figure 6:
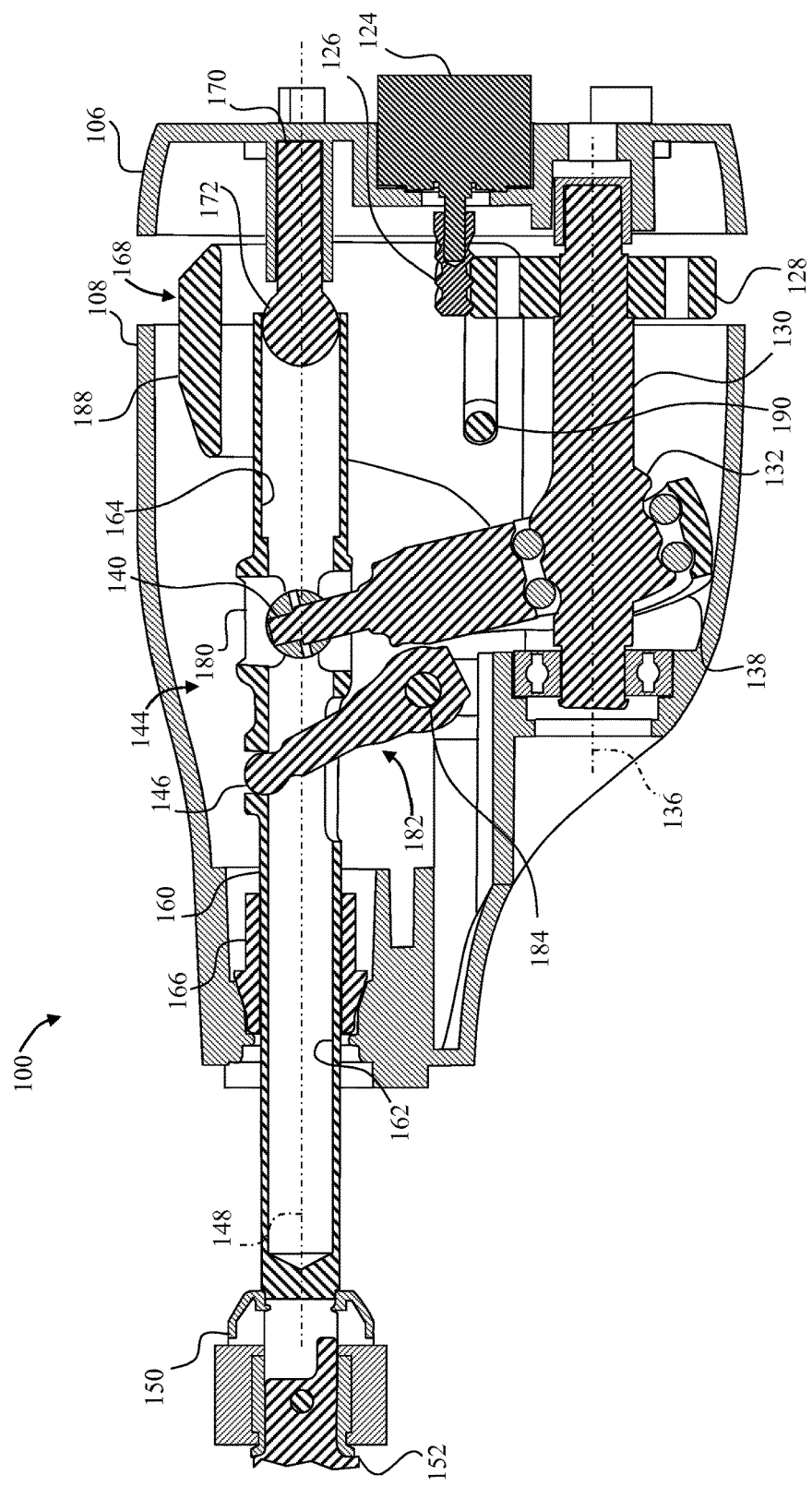
FIG. 6 depicts a side cross-sectional view of the tool of FIG. 1 with the housing removed and the counterweight at its rearward-most location.

Continued rotation of the drive shaft 130 results in further forward movement of the plunger 146 to the location shown in FIG. 6. With the plunger 146 at its forward-most location, the counterweight 188 is forced to its rearward-most location. In the embodiment of FIG. 6, the counterweight 188 wraps around the entire head portion 172 when the counterweight 188 is at its rearward-most location.

As the motor 124 continues to rotate, the above described movement of the wobble plate assembly 138 is reversed, causing the movement of the counterweight 188 and the plunger 146 to be reversed. The plunger 146 thus reciprocates along the plunger axis 148 out of phase with the reciprocation of the counterweight 188 along the plunger axis 148.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A reciprocating tool, comprising:
   a plunger configured to reciprocate along an axis, the plunger including an inner wall defining a chamber portion within the plunger;
   a motor operably connected to the plunger;
   a bushing located at least partially within the chamber and configured to support the plunger as the plunger reciprocates by contacting the inner wall with a non-reciprocating spherical portion of the bushing; and
   a reciprocating counterweight wrapping at least partially about an outer wall of the plunger.

2. The reciprocating tool of claim 1, further comprising:
   a pivot arm assembly operably connected to the plunger and to the counterweight such that as the plunger moves forwardly, the counterweight moves rearwardly.

3. The reciprocating tool of claim 2, wherein:
   the counterweight is movable between a forward-most location and a rearward-most location; and
   when the counterweight is at the rearward-most location, the head portion is at least partially surrounded by the counterweight.

4. The reciprocating tool of claim 1, wherein:
   the bushing includes a stem portion;
   a maximum diameter of the stem portion is less than a maximum diameter of the spherical portion; and
   the stem portion is mounted within a receptacle defined by a housing portion of the reciprocating tool.

5. The reciprocating tool of claim 4, wherein the receptacle and the chamber portion are axially aligned.

6. A method of operating a reciprocating tool, comprising:
   rotating a shaft with a motor;
   translating the rotation of the shaft into a reciprocating motion of a plunger;
   supporting the reciprocating plunger with a non-reciprocating spherical head of a bushing located at least partially within a chamber defined by the plunger; and reciprocating a counterweight wrapped at least partially about an outer wall of the plunger in opposition to the reciprocation of the plunger.

7. The method of claim 6, wherein supporting the reciprocating plunger comprises:
contacting an inner wall of the chamber with the spherical head portion of the bushing.

8. The method of claim 6, wherein reciprocating the counterweight comprises:
reciprocating the counterweight using a pivot arm assembly operably connected to the plunger and to the counterweight such that as the plunger moves forwardly, the counterweight moves rearwardly.

9. The method of claim 8, wherein:
the counterweight is movable between a forward-most location and a rearward-most location; and reciprocating the counterweight comprises:
reciprocating the counterweight to a rearward-most location whereat the non-reciprocating spherical head portion of the bushing is located within the chamber and is at least partially surrounded by the counterweight.

10. A reciprocating tool, comprising:
a plunger configured to reciprocate along an axis, the plunger including an inner wall defining a chamber portion within the plunger;
a motor operably connected to the plunger;
a bushing located at least partially within the chamber and configured to support the plunger as the plunger reciprocates by contacting the inner wall with a non-moving head portion of the bushing; and
a reciprocating counterweight wrapping at least partially about an outer wall of the plunger, wherein:
the bushing includes a stem portion;
a maximum diameter of the stem portion is less than a maximum diameter of the head portion; and
the stem portion is mounted within a receptacle defined by a housing portion of the reciprocating tool.

11. The reciprocating tool of claim 10, further comprising:
a pivot arm assembly operably connected to the plunger and to the counterweight such that as the plunger moves forwardly, the counterweight moves rearwardly.

12. The reciprocating tool of claim 11, wherein:
the counterweight is movable between a forward-most location and a rearward-most location; and
when the counterweight is at the rearward-most location, the head portion is at least partially surrounded by the counterweight.

13. The reciprocating tool of claim 10, wherein the receptacle and the chamber portion are axially aligned.

14. The reciprocating tool of claim 13, wherein the head portion is a spherical head portion.

* * * * *